No. 784,867. PATENTED MAR. 14, 1905.
C. R. LAW.
ROD PACKING.
APPLICATION FILED OCT. 10, 1904.
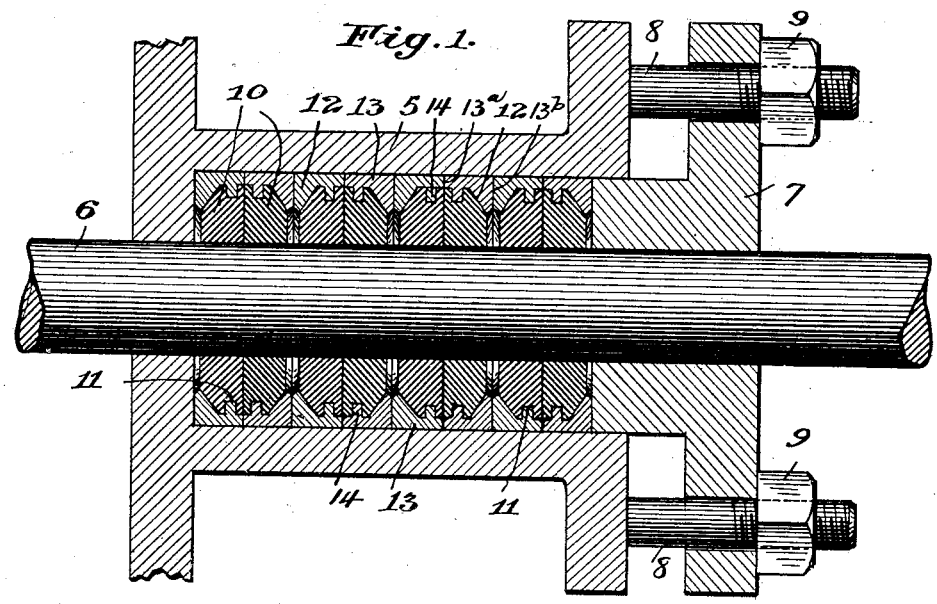
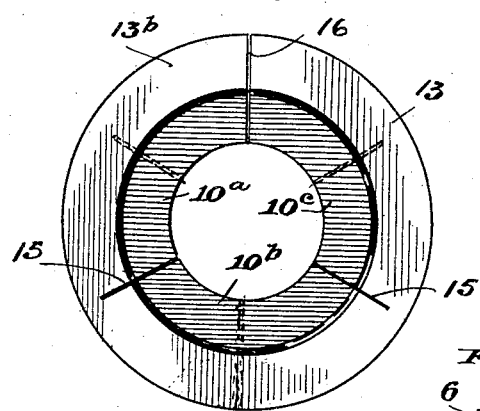
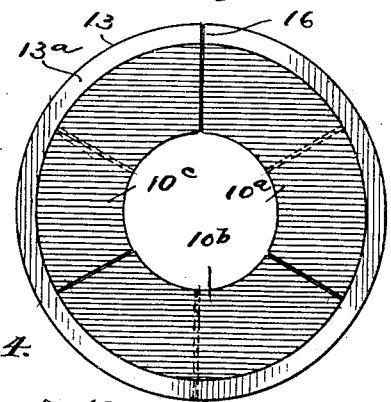
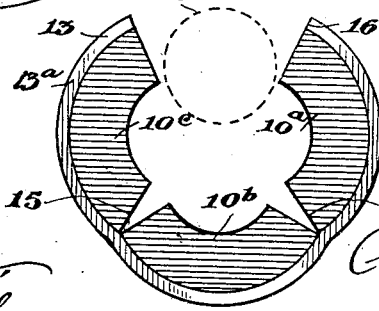
Witnesses,
Inventor,
Charles R. Law No. 784,867. Patented March 14, 1905.

UNITED STATES PATENT OFFICE.

CHARLES R. LAW, OF SHREVEPORT, LOUISIANA.

ROD-PACKING.

SPECIFICATION forming part of Letters Patent No. 784,867, dated March 14, 1905.

Application filed October 10, 1904. Serial No. 227,893.

*To all whom it may concern:*

Be it known that I, CHARLES R. LAW, a citizen of the United States, residing at Shreveport, in the parish of Caddo and State of Louisiana, have invented certain new and useful Improvements in Rod-Packings, of which the following is a specification.

This invention relates to a packing for stuffing-boxes for piston-rods, valve-stems, or any parts requiring a tight joint, whether stationary or having a reciprocating, oscillating, rotating, or semirotating motion, the construction being such as to present a perfect all-metal bearing to the rod or wearing-surface and at the same time forming a perfectly tight elastic joint upon the walls of the stuffing-box.

The general object of the invention is to provide an improved packing of this class characterized by increased simplicity of construction and greater economy of manufacture.

Another object is to provide a packing which may be applied to the rod transversely of the latter without requiring the rod to be removed for the purpose of slipping the packing-ring over the end thereof.

Generally stated, the invention resides in a packing comprising a series of packing-rings each formed by a sectional inside portion of suitable composition metal bored out to the exact diameter of the rod it is desired to fit, said ring having preferably a retaining-groove in its periphery, approximately at one side thereof, and having the remainder of the periphery beveled or inclined from the inside edge of the retaining-groove inwardly toward the inside diameter or bore of the ring, in combination with an outer ring or short cylinder of elastic material, preferably rubber, which may have a tongue fitting into the groove in the metal ring and which has an inner inclined surface that conforms closely to the inclined surface of the metal ring, but is not fastened thereto. The rubber is so designed as to come flush on one side with the flat surface of the metallic ring, but projects longitudinally beyond the opposite beveled side of the metal ring a sufficient distance to allow taking up or compressing by the action of the gland to compensate for wear. In the manufacture of the rings the metallic section is divided into any suitable number of parts, leaving the periphery of the rubber cylinder intact, and in applying the packing to the rod the rubber is cut opposite one of the points of division of the metal ring, the rubber at the remaining point or points of division acting as a hinge and permitting the packing to be readily opened and spread over the rod transversely of the latter for the purpose of its insertion into the stuffing-box. The rings are applied in such a manner as to bring similar faces in contact, and the series of rings are compressed by the gland, so as to force the metal sections inwardly upon the rod and the elastic sections outwardly against the walls of the stuffing-box.

My invention will be readily understood by reference to the accompanying drawings, which illustrate a preferred mechanical embodiment thereof, and in which—

Figure 1 is a longitudinal sectional view of the complete stuffing-box applied to the rod. Fig. 2 is a face view of one side of the packing-rings, the relative joints of the next adjacent rings being indicated by dotted lines. Fig. 3 is a similar view of the opposite face of the ring, and Fig. 4 is a view illustrating the mode of application of the ring to the rod.

Referring to the drawings, 5 designates the stuffing-box, 6 the rod, 7 the gland, and 8 and 9 the gland-tightening bolts and nuts, respectively, these parts being all as usual in rod packings.

10 designates as an entirety the inner metallic portion of the packing-ring, which may be of Babbitt metal or any other soft composition metal recognized as suitable for metallic packings. This ring is formed in a series of sections, (three being herein shown and designated $10^a$, $10^b$, and $10^c$, respectively.) The outer periphery of the ring 10 has formed therein, preferably to one side of the longitudinal center of the ring, an annular groove 11, while the opposite half of its periphery is formed with a beveled or inclined surface 12, extending inwardly at any suitable angle toward the inner periphery of the ring. Surrounding the ring 10 is an external ring or short cylinder of elastic material, preferably rubber, (designated by 13.) This ring has an internal annular tongue 14, which fits in the groove 11 of the metallic ring. The narrower face 13ª of the ring 13 just beyond the tongue lies flush with the adjacent face of the inner ring, as clearly shown in Fig. 1, while the opposite wider face 13ᵇ projects somewhat beyond the adjacent face of the inner ring. Preferably, and as shown at 15 in Fig. 2, the radial cuts of the inner metallic ring are extended some distance into the thicker beveled portion of the rubber ring to render the latter more readily expansible for purposes of application to the rod; but this is not essential, and for purposes of application to the rod without the necessity of slipping the ring over the end of the rod the outer ring is cut entirely through radially at a point 16 in line with one of the radial cuts of the inner ring.

The tongue of the outer elastic cylinder is inserted into the groove of the inner ring, being retained therein either by clamping or a suitable cement, and in applying the rings to the rod the former is expanded and opened at the radial division-point 16 sufficiently to admit the rod therethrough in the manner clearly indicated in Fig. 4. The rings are applied in such a manner as to bring the metal faces together and the rubber faces together, as clearly shown in Fig. 1. The first ring is inserted in the box with the rubber side first, the rubber forming a joint upon the inside wall of the box, and the remaining rings are then inserted with their metal and rubber faces first alternately. The rings are also so disposed as to cause the radial divisions to break joints in a manner common with all sectional ring-packing, as indicated in Figs. 2 and 3. A sufficient number of rings being inserted in the box, the gland is then inserted and the packing compressed by the tightening of the gland-bolts in the usual manner. The compression of the gland upon the packing forces the rubber up the inclined surfaces of the sectional metal rings, forming a tight joint upon the walls of the stuffing-box and at the same time forcing the metal sections inwardly with equal effectiveness upon the rod.

I am aware that it is old in rod-packings to employ a series of packing-rings each composed of an inner soft-metal member and a surrounding elastic member; but so far as I am aware the construction and relative arrangement of these parts substantially as herein shown and described is novel and productive of a highly-efficient stuffing-box having a minimum of parts and extreme simplicity and convenience of application.

I claim—

1. In a rod-packing, the combination with a stuffing-box and compressing-gland, of a series of packing-rings each comprising an inner soft-metal member and an outer elastic member interlockingly engaged with and connected to said inner member, said inner and outer members unitedly constituting a unitary and independent packing-ring, substantially as described.

2. In a rod-packing, the combination with a stuffing-box and compressing-gland, of a series of flat-faced packing-rings each comprising an inner soft-metal member and an outer elastic member interlockingly engaged with and connected to said inner member, said inner and outer members having flat, beveled, annular contacting-surfaces and unitedly constituting a unitary and independent packing-ring, substantially as described.

3. In a rod-packing, the combination with a stuffing-box and compressing-gland, of a series of packing-rings each comprising a sectional inner ring of soft metal having a beveled periphery and an outer ring or cylinder of elastic material having an internally-beveled periphery adapted to fit and coöperate with the beveled periphery of said inner ring, said outer ring being cut through radially in line with one of the divisions of the inner ring and being also partially cut through in line with the other divisions of the inner ring, substantially as described.

4. In a rod-packing, the combination with a stuffing-box and compressing-gland, of a series of packing-rings each comprising a sectional inner ring of soft metal having one side of its periphery beveled, and an outer ring or cylinder of elastic material internally formed to fit the periphery of the inner ring, said outer ring or cylinder being flush with the inner ring on the straight side of the periphery of the latter and on its opposite side projecting beyond the beveled side of the inner ring, said rings being arranged in the stuffing-box with their flush surfaces in contact with each other and with the projecting faces of the outer rings in contact with each other, substantially as described.

CHARLES R. LAW.

Witnesses:
J. D. WILKINSON,
B. DILLINGHAM.